(12) United States Patent
Mao et al.

(10) Patent No.: US 8,381,447 B2
(45) Date of Patent: Feb. 26, 2013

(54) DOOR PANEL OPENING AND CLOSING DEVICE FOR A CASING

(75) Inventors: Zhong-Hui Mao, Taipei Hsien (TW); Chuan-Chi Wang, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 263 days.

(21) Appl. No.: 12/828,377

(22) Filed: Jul. 1, 2010

(65) Prior Publication Data

US 2011/0005139 A1 Jan. 13, 2011

(30) Foreign Application Priority Data

Jul. 9, 2009 (TW) .............................. 98123198 A

(51) Int. Cl.
*E05F 1/10* (2006.01)
(52) U.S. Cl. ............... 49/386; 16/281; 16/286; 16/291; 16/293
(58) Field of Classification Search .................... 49/386; 16/280, 281, 285, 286, 291, 293
See application file for complete search history.

(56) References Cited

U.S. PATENT DOCUMENTS

| 527,158 | A | | 10/1894 | Rippien | |
|---|---|---|---|---|---|
| 2,117,148 | A | * | 5/1938 | Clark | 16/281 |
| 2,244,168 | A | * | 6/1941 | Miller | 99/337 |
| 3,345,681 | A | * | 10/1967 | Pletscher | 16/291 |
| 3,906,587 | A | * | 9/1975 | Little | 16/289 |
| 4,690,468 | A | * | 9/1987 | Lau | 312/291 |
| 4,979,265 | A | * | 12/1990 | Grass | 16/291 |
| 5,488,757 | A | * | 2/1996 | Cohen et al. | 16/289 |
| 6,505,381 | B1 | * | 1/2003 | Thomson et al. | 16/302 |
| 6,553,622 | B2 | * | 4/2003 | Maruyama et al. | 16/277 |
| 6,574,835 | B2 | * | 6/2003 | Melhuish | 16/282 |
| 8,177,445 | B2 | * | 5/2012 | Jones et al. | 400/693 |
| 2007/0101542 | A1 | * | 5/2007 | Lee | 16/286 |
| 2011/0296761 | A1 | * | 12/2011 | Wood et al. | 49/70 |

FOREIGN PATENT DOCUMENTS

| CN | 1097836 | 1/1995 |
|---|---|---|
| EP | 1 884 614 B1 | 7/2010 |
| WO | 94/24394 | 10/1994 |

OTHER PUBLICATIONS

Chinese Office Action for Chinese Application No. 200910157814.5 dated Nov. 17, 2011.
Taiwanese Search Report for Taiwanese Application No. 098123198 dated Jul. 6, 2012.
Chinese Office Action for Chinese Application No. 200910157814.5 dated Mar. 26, 2012.

* cited by examiner

*Primary Examiner* — Jerry Redman
(74) *Attorney, Agent, or Firm* — Turocy & Watson, LLP

(57) ABSTRACT

A door panel opening and closing device for a casing includes a face panel, a door panel, and a resilient member. The face panel includes a base wall and a first post disposed on the base wall. The door panel includes a pivot arm pivoted to the base wall and having a second post. A pivot juncture between the pivot arm and the base wall is defined as a turning axis. The door panel is turnable about the turning axis between closed and open positions. The resilient member is an extension spring having two ends hooked to the first and second posts, respectively. When the door panel is turned from the closed position past a specific angular position, the door panel will automatically spring to the open position by virtue of a directional change of a component of tension force of the resilient member to an outward direction.

18 Claims, 9 Drawing Sheets

DOOR PANEL OPENING AND CLOSING DEVICE FOR A CASING

CROSS-REFERENCE TO RELATED APPLICATION

This application claims priority of Taiwanese Application No. 098123198, filed on Jul. 9, 2009.

BACKGROUND OF THE INVENTION

1. Field of the Invention

The invention relates to a door panel opening and closing device for a casing, more particularly to a door panel opening and closing device for a casing which can automatically turn to an open position or a closed position after being turned past a specific angular position.

2. Description of the Related Art

A conventional casing for holding a storage device for storing a hard disk, or a server generally includes a casing body and a door panel connected pivotally to a front side of the casing body. The door panel is turnable between a closed position where the door panel shields the front side of the casing body, and an open position where the front side of the casing body is accessible. One such casing for an electronic device is disclosed in Taiwanese Utility Model No. M344006.

However, the turning of the door panel from the closed position to the open position or vice versa requires manual turning of the door panel by a user. Therefore, to devise a structure with a door panel that will automatically turn to a desired open or closed position after being turned past a specific angular position is the subject of improvement of this invention.

SUMMARY OF THE INVENTION

Therefore, a primary object of the present invention is to provide a door panel opening and closing device for a casing, in which a door panel can be automatically turned to an open position after being turned relative to a face panel of the casing from a closed position and past a specific angular position.

Another object of the present invention is to provide a door panel opening and closing device for a casing, in which a door panel can be automatically turned to a closed position after being turned relative to a face panel of the casing from an open position and past a specific angular position.

The objects of this invention and solutions to the technical problems associated with the prior art are realized using the following technical means. According to one aspect, the door panel opening and closing device for a casing according to the present invention comprises a face panel, a door panel, and a resilient member.

The face panel includes a substantially horizontal base wall and a first post disposed on the base wall. The door panel includes a pivot arm connected pivotally to the base wall. A pivot juncture between the pivot arm and the base wall is defined as a turning axis. The pivot arm includes a second post disposed parallel to and spaced apart from the first post. The door panel is turnable about the turning axis between a closed position where the door panel shields a front side of the face panel and an open position where the front side of the face panel is accessible. The resilient member has two ends connected respectively to the first post and the second post. When the door panel is disposed at the closed position, the second post and the turning axis are located at an inner side of the first post, the turning axis is located at a front side of the resilient member, and the first and second posts and the turning axis cooperatively define a triangle. When the door panel is disposed at a specific angular position between the closed position and the open position, the first post, the turning axis, and the second post are sequentially located on a same straight line. The door panel automatically springs to the open position by virtue of a change in a direction of a force component of a tension force of the resilient member to an outward direction once the door panel is turned from the closed position past the specific angular position.

In the aforementioned door panel opening and closing device for a casing of the present invention, the resilient member is an extension spring having two ends hooked to the first post and the second post, respectively. Thus, when the door panel is turned from the closed position and past the specific angular position, the direction of the force component of the tension force of the extension spring changes from an inward direction to an outward direction to enable the door panel to automatically spring to the open position.

In the aforementioned door panel opening and closing device for a casing of the present invention, a distance between the first and second posts is greater than that between the first post and the turning axis and that between the second post and the turning axis. Thus, when the door panel is turned relative to the face panel to the specific angular position, the first post, the turning axis, and the second post can be sequentially located on the same straight line.

In the aforementioned door panel opening and closing device for a casing of the present invention, when the door panel is at the open position, the turning axis is located at an inner side of the extension spring. The door panel automatically springs back to the closed position by virtue of a change in the direction of the force component of the tension force of the resilient member to the inward direction once the door panel is turned from the open position past the specific angular position.

In the aforementioned door panel opening and closing device for a casing of the present invention, the distance between the first and second posts gradually increases when the door panel is being turned from the closed position or the open position to the specific angular position. The distance between the first and second posts is the longest and a value of the tension force of the resilient member is the largest when the door panel is at the specific angular position. Thus, even if a user gradually decreases the force applied to a panel body of the door panel during the process of pulling or pushing the door panel, the door panel can still be brought to turn from the closed position or the open position to the specific angular position.

In the aforementioned door panel opening and closing device for a casing of the present invention, the face panel further includes a first pivot member disposed on the base wall. The pivot arm further includes a second pivot member disposed on an arm portion of the pivot arm and connected pivotally to the first pivot member. The first pivot member is one of a pivot hole and a pivot pin, and the second pivot member is the other of the pivot hole and the pivot pin. The first and second pivot members cooperatively define the turning axis.

In the aforementioned door panel opening and closing device for a casing of the present invention, the pivot arm includes two L-shaped arm portions that are spaced apart one above the other. The second post is connected to the arm portions, and the resilient member is received between the arm portions. Thus, there is no need to provide extra room for movement of the resilient member, and the resilient member will not come into interference with the first and second pivot members when being brought to turn by the door panel.

In the aforementioned door panel opening and closing device for a casing of the present invention, the face panel further includes a sidewall connected to the base wall, and the door panel further includes a panel body for shielding the front side of the face panel. The pivot arm is disposed on a rear surface of the panel body, and includes a stop portion projecting from one of the two arm portions for abutting against an inner wall surface of the sidewall so as to limit a turning angle of the panel body, whereby the panel body can be prevented from bumping against an outer wall surface of the sidewall.

According to another aspect, the door panel opening and closing device for a casing according to the present invention comprises a face panel, a door panel and a resilient member.

The face panel includes a substantially horizontal base wall and a first post disposed on the base wall. The door panel includes a pivot arm connected pivotally to the base wall. A pivot juncture between the pivot arm and the base wall is defined as a turning axis. The pivot arm includes a second post disposed parallel to and spaced apart from the first post. The door panel is turnable about the turning axis between a closed position where the door panel shields a front side of the face panel and an open position where the front side of the face panel is accessible. The resilient member has two ends connected respectively to the first post and the second post. When the door panel is disposed at the open position, the second post and the turning axis are located at a front side of the first post, the turning axis is located at an inner side of the resilient member, and the first and second posts and the turning axis cooperatively define a triangle. When the door panel is disposed at a specific angular position between the closed position and the open position, the first post, the turning axis, and the second post are sequentially located on a same straight line. The door panel automatically springs to the closed position by virtue of a change in a direction of a force component of a tension force of the resilient member to an inward direction once the door panel is turned from the open position past the specific angular position.

In the door panel opening and closing device for a casing of the present invention, due to the relationships among the first post, the second post and the turning axis, turning of the door panel from the closed position to the open position merely requires the user to move the door panel past the specific angular position, whereupon the direction of the force component of the tension force of the resilient member will change to an outward direction and the resultant torque will cause the door panel to automatically spring to the open position. Conversely, turning of the door panel from the open position to the closed position merely requires the user to move the door panel past the specific angular position, whereupon the direction of the force component of the tension force of the resilient member will change to an inward direction and the resultant torque will cause the door panel to automatically spring to the closed position.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Through a description of the preferred embodiment, the technical means employed by the present invention to achieve the intended objects, and the advantageous effects contemplated thereby, can be better understood and appreciated. It is noted that the accompanying drawings are for illustration and reference only, and are not intended to limit the scope of the present invention.

Figure 1:
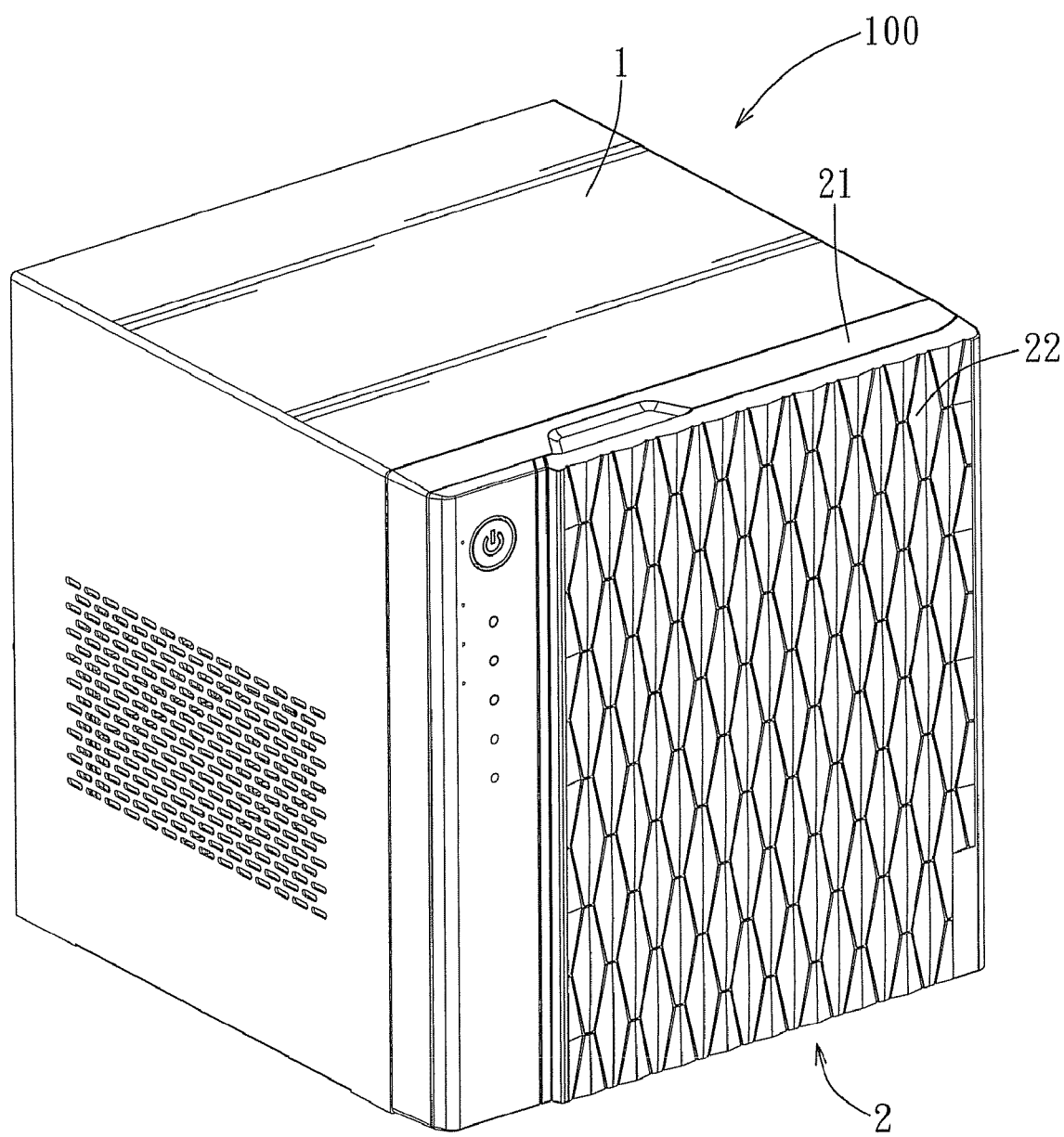
FIG. 1 is a perspective view of a preferred embodiment of a door panel opening and closing device for a casing according to the present invention.
Figure 2:
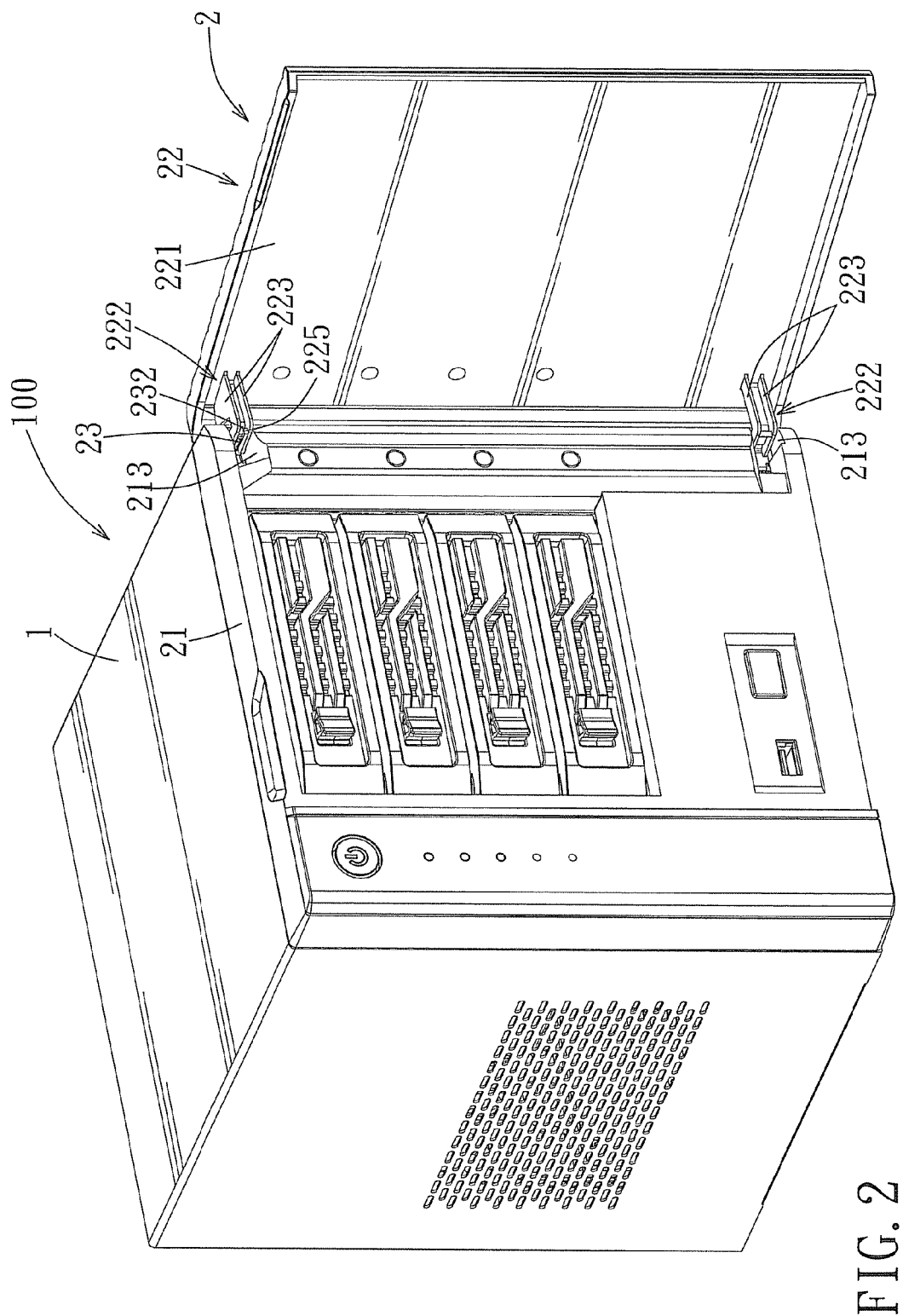
FIG. 2 is a perspective view to illustrate a door panel of the preferred embodiment of a door panel opening and closing device for a casing according to the present invention at an open position.

Referring to FIG. 1 and FIG. 2, the preferred embodiment of a door panel opening and closing device 2 for a casing 100 according to the present invention is for application to an electronic device, such as a storage device for storing a hard disk, or a server. The casing 100 includes a casing body 1 and the door panel opening and closing device 2.

Figure 3:
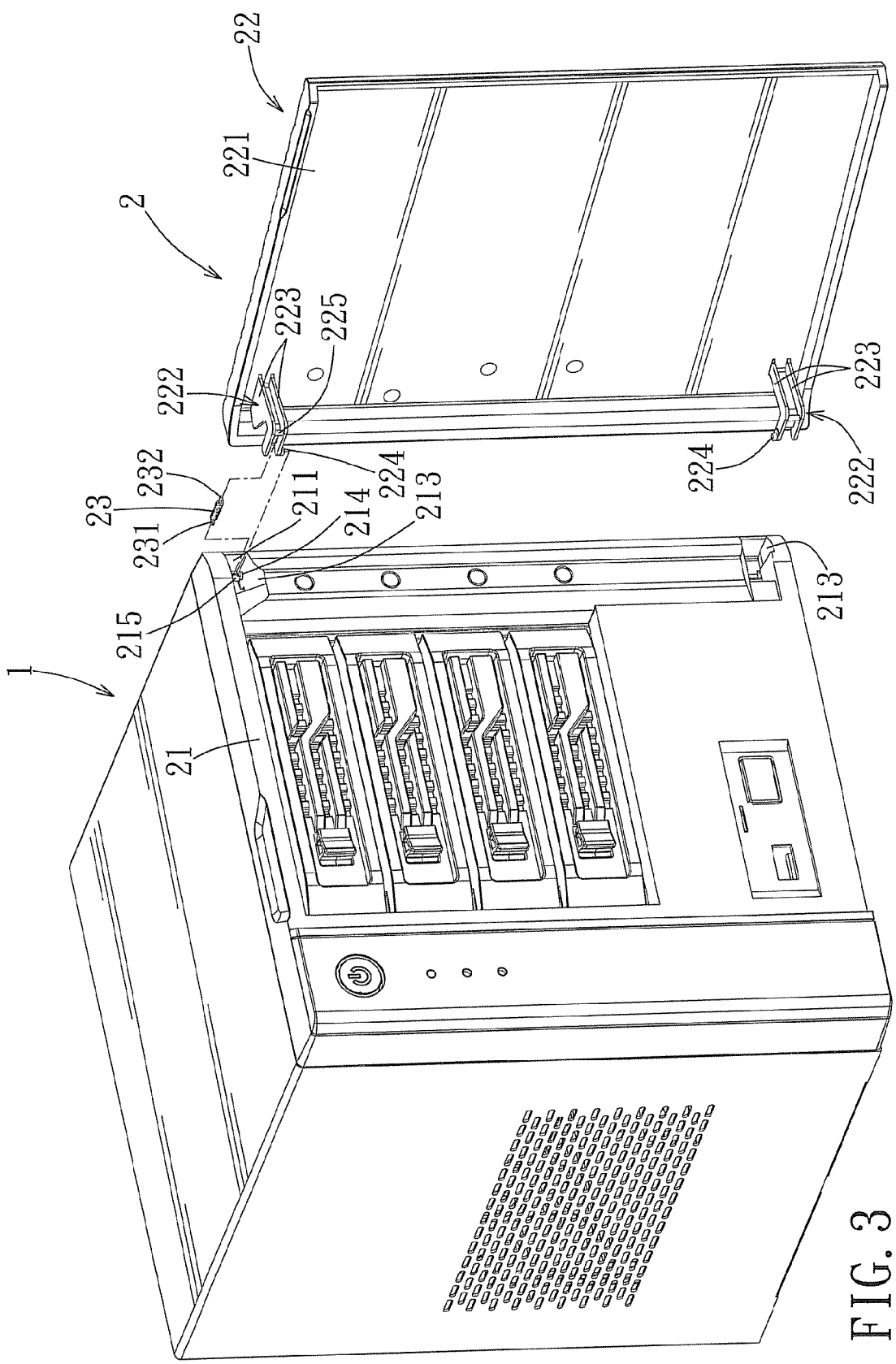
FIG. 3 is an exploded perspective view of the preferred embodiment of a door panel opening and closing device for a casing according to the present invention, showing the assembly relationships among a face panel, the door panel, and an extension spring.
Figure 4:
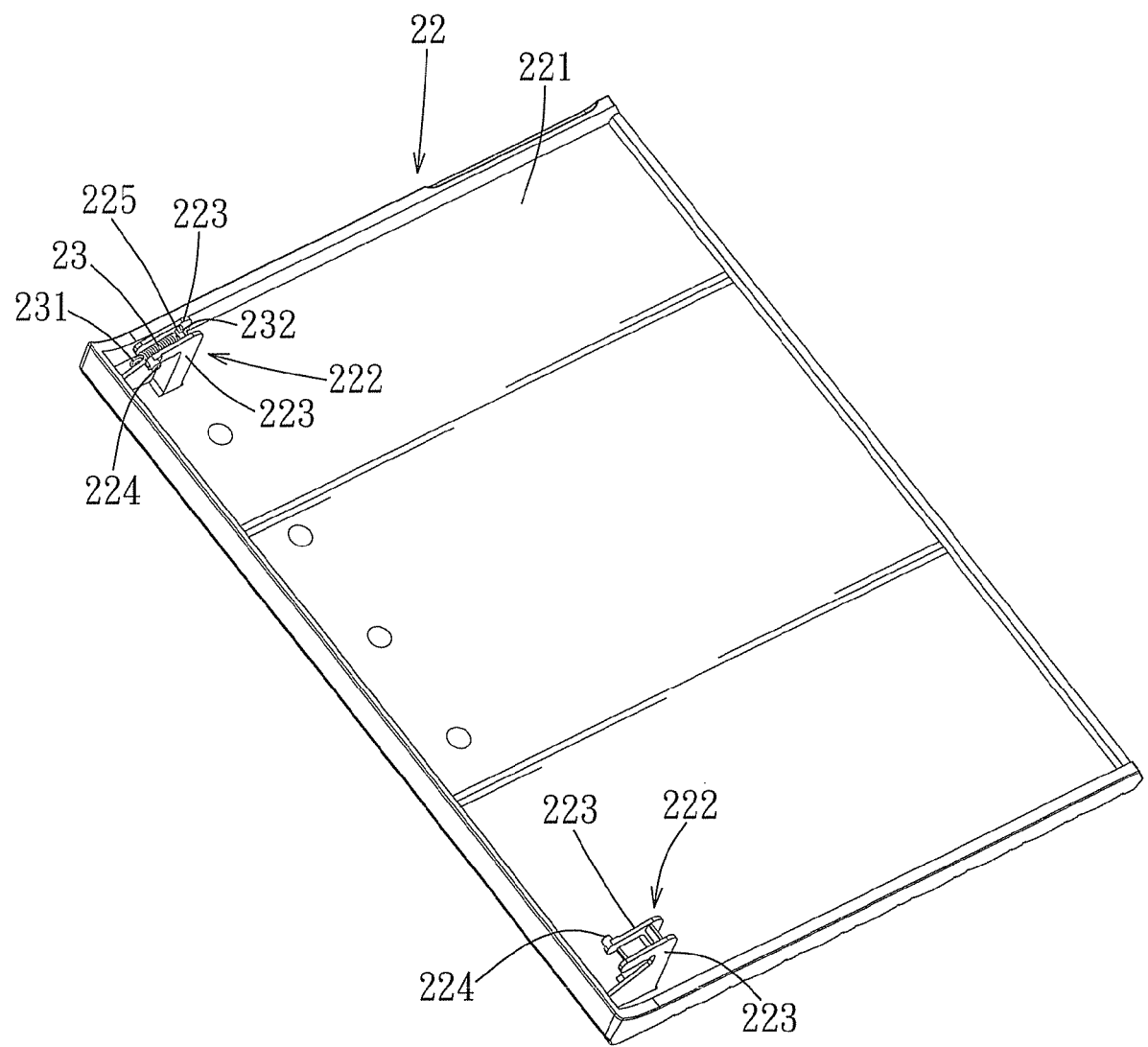
FIG. 4 is a perspective view of the door panel of the preferred embodiment of a door panel opening and closing device for a casing according to the present invention, illustrating a second end of the extension spring hooked to a second post.
Figure 5:
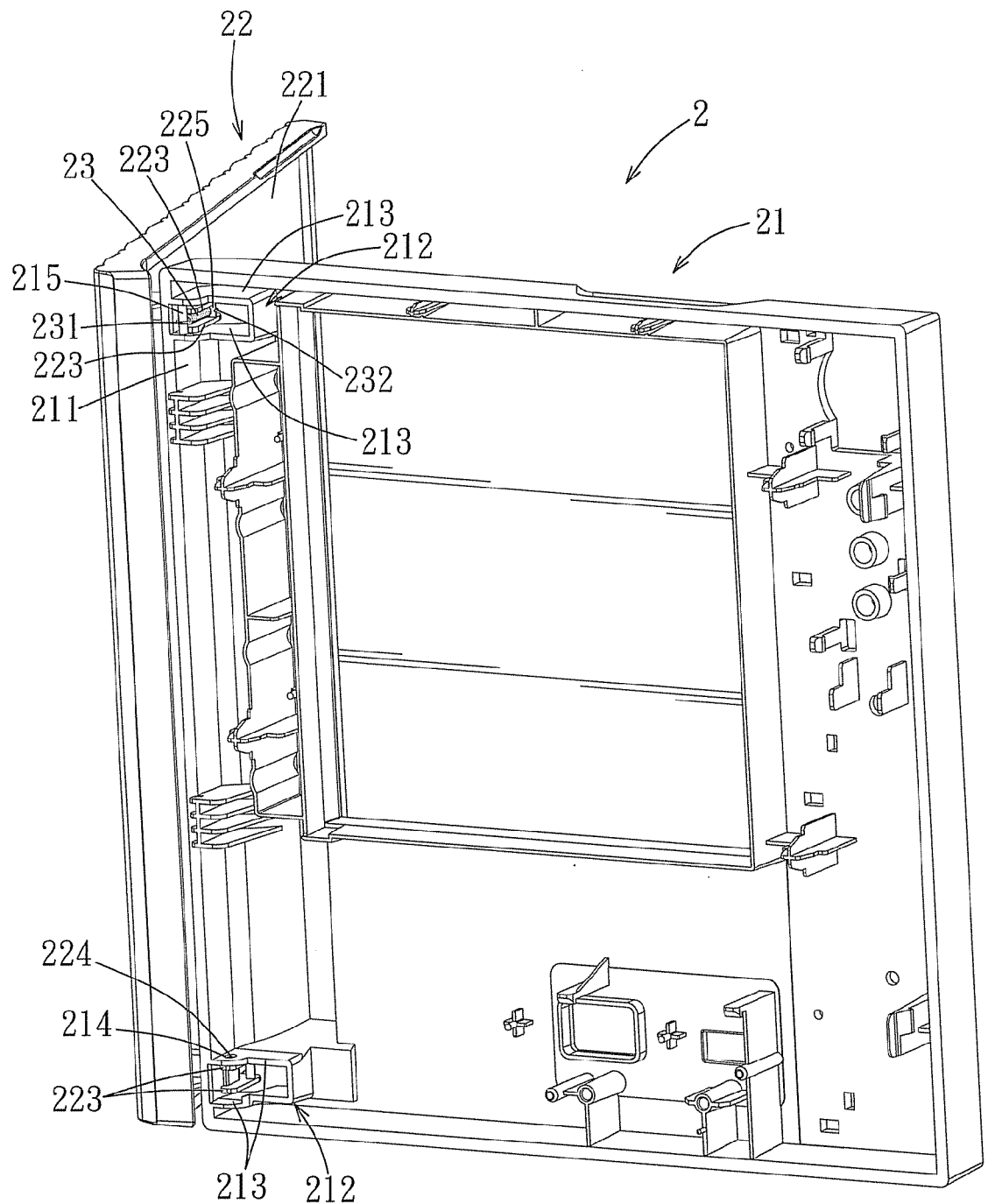
FIG. 5 is a perspective view of the preferred embodiment of a door panel opening and closing device for a casing according to the present invention when viewed from another angle.

Referring to FIGS. 3 to 5, the door panel opening and closing device 2 includes a face panel 21 assembled to a front side of the casing body 1, a door panel 22 connected pivotally to the face panel 21, and a resilient member. In this embodiment, the resilient member is an extension spring 23. The face panel 21 includes an upright sidewall 211, and two mounting brackets 212 projecting from an inner wall surface of the sidewall 211 and spaced apart one above the other. Each of the mounting brackets 212 has open front and rear ends, and includes two horizontally extending base walls 213 that are spaced apart one above the other. The lower base wall 213 of the upper mounting bracket 212 is provided with a first pivot member 214. The upper base wall 213 of the lower mounting bracket 212 is provided with another first pivot member 214. The two first pivot members 214 correspond in position, and each of the first pivot members 214 is a pivot hole extending through the respective base wall 213.

Figure 6:
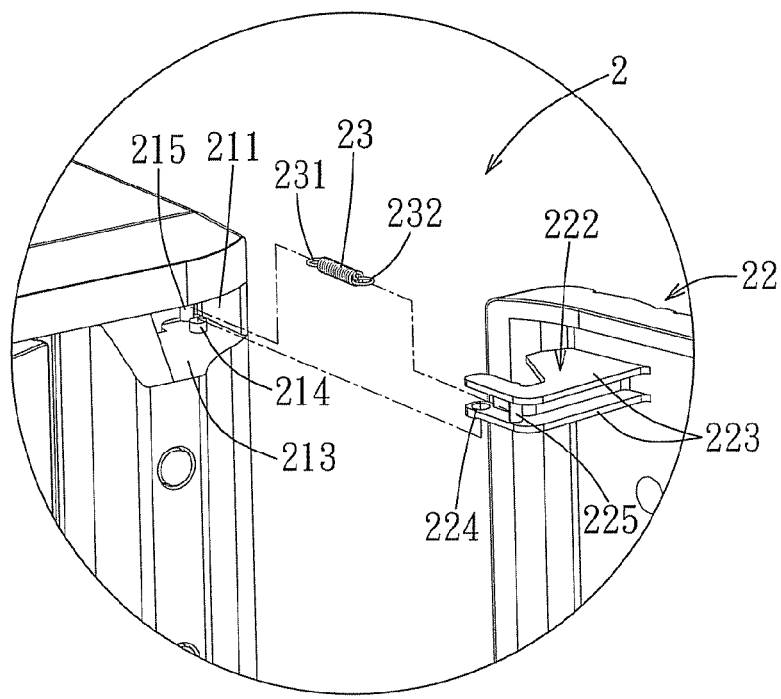
FIG. 6 is an enlarged fragmentary view of the preferred embodiment of a door panel opening and closing device for a casing according to the present invention, illustrating a first pivot member in the form of a pivot pin and a second pivot member in the form of a pivot hole.

The door panel 22 includes a panel body 221 to shield the front side of the face panel 21, and two pivot arms 222 that project from a rear surface of the panel body 221. Each of the pivot arms 222 includes two flat-lying L-shaped arm portions 223 that are spaced apart one above the other. The lower arm portion 223 of the upper pivot arm 222 has a bottom face provided with a second pivot member 224. The upper arm portion 223 of the lower pivot arm 222 has a top face provided with another second pivot member 224. The second pivot members 224 of the two pivot arms 222 correspond in position, and each of the second pivot members 224 is a pivot pin that is engageable pivotably with a respective one of the first pivot members 214. Each of the pivot arms 222 of the door panel 22 is mounted between the two base walls 213 of the respective mounting bracket 212 from the front end of the respective mounting bracket 212 such that the second pivot member 224 of each of the pivot arms 222 extends through the first pivot member 214 of the respective mounting bracket 212, whereby the door panel 22 is turnable relative to the face panel 21 within a specific angle about the first and second pivot members 214, 224. Certainly, in design, the first pivot members 214 may be configured to be pivot pins (see FIG. 6) projecting from the respective base walls 213, and the second pivot members 224 may be configured to be pivot holes (see FIG. 6) to respectively engage the pivot pins.

In addition, the upper mounting bracket 212 further includes a first post 215 connected to the two base walls 213 thereof and disposed to a rear side of the first pivot member 214 thereof. The upper pivot arm 222 further includes a second post 225 connected to the two arm portions 223 thereof and disposed adjacent to bends of the arm portions 223. The second post 225 extends in a direction parallel to the direction in which the first post 215 extends, and is spaced apart from the first post 215. The extension spring 23 is disposed between the two arm portions 223 of the upper pivot arm 222, and includes a first end 231 hooked to the first post 215, and a second end 232 hooked to the second post 225.

Figure 7:
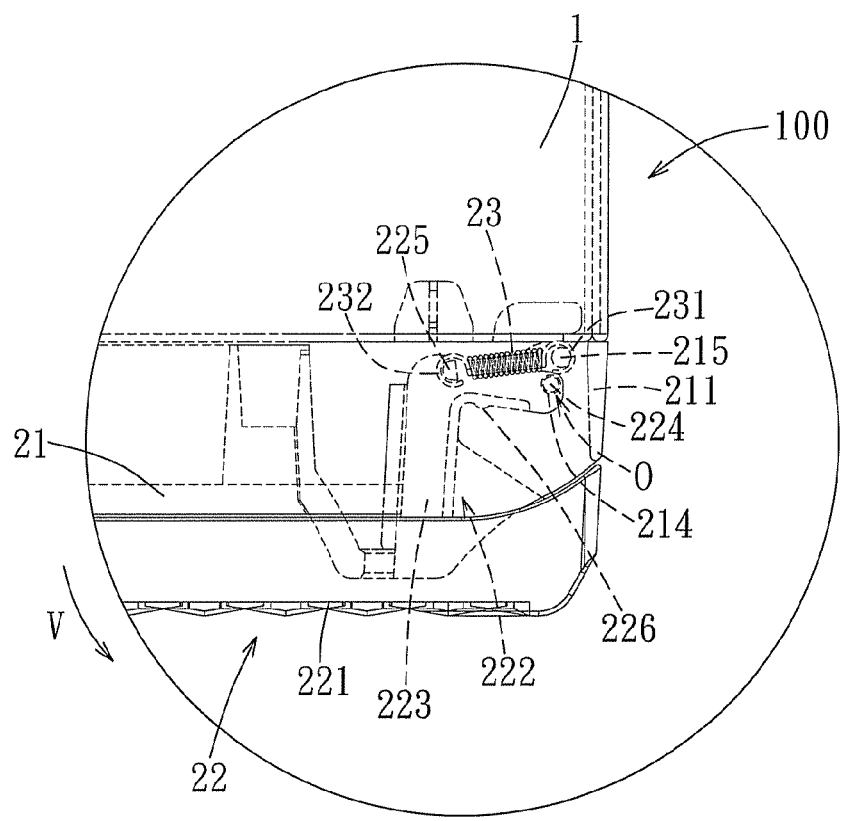
FIG. 7 is an enlarged fragmentary top view to illustrate the door panel of the preferred embodiment of a door panel opening and closing device for a casing according to the present invention at a closed position.

Referring to FIG. 7, which is an enlarged fragmentary top view of the casing 100, the second pivot member 224 of the upper pivot arm 222 and the first pivot member 214 of the lower base wall 213 of the upper mounting bracket 212 cooperatively define a turning axis (O) at a pivot juncture between the upper pivot arm 222 and the upper mounting bracket 212. The door panel 22 is turnable about the turning axis (O) between a closed position (see FIG. 7) where the door panel 22 shields the front side of the face panel 21 and an open position (see FIG. 9) where the front side of the face panel 21 is accessible.

Figure 10:
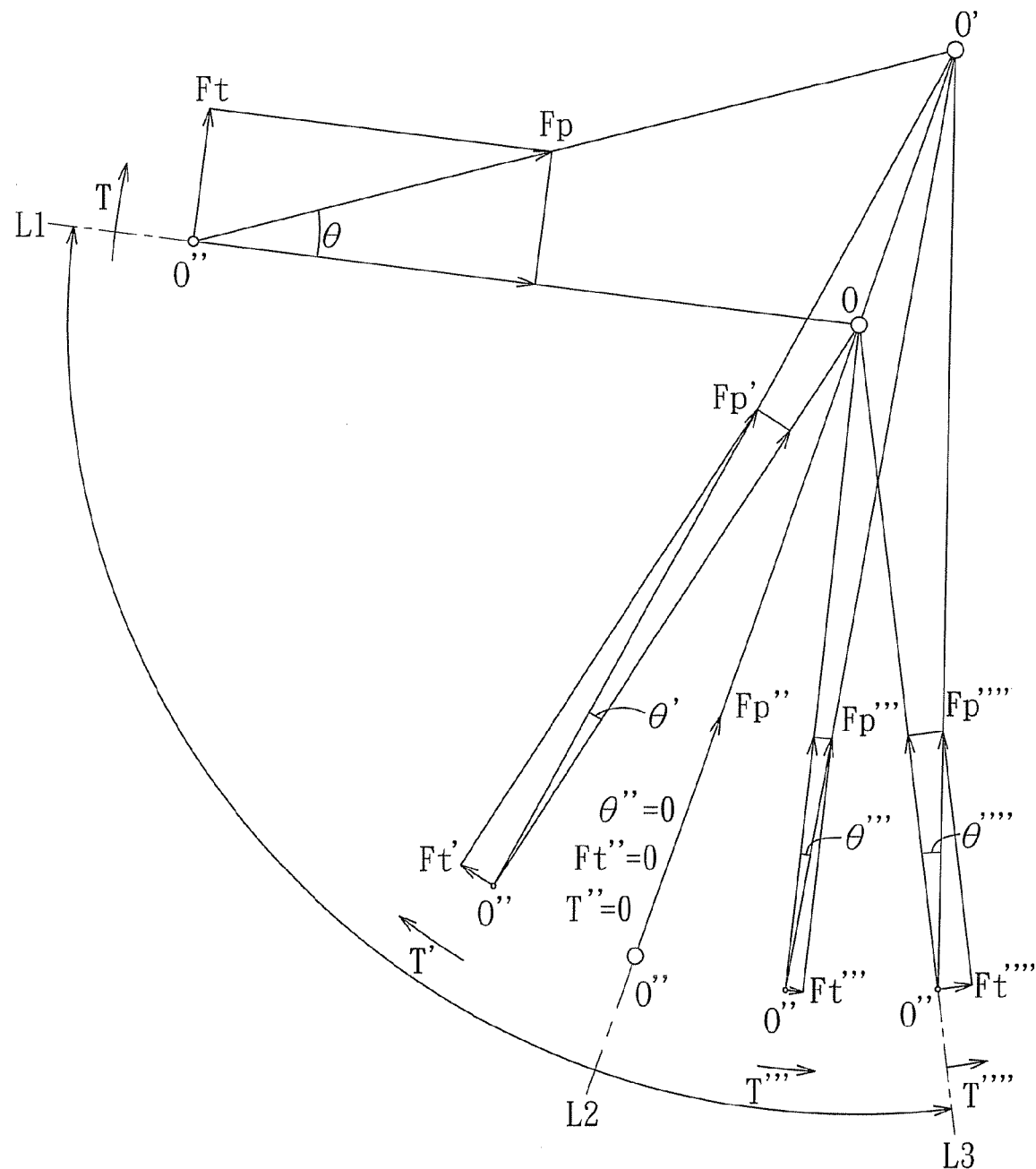
FIG. 10 is a schematic diagram to illustrate changes in positions of a turning axis, and first and second posts, as well as changes in a force component of the tension force of the extension spring, during the process of turning of the door panel between the closed and open positions.

Reference is now made to FIGS. 7 and 10. It is noted that the description to follow will be focused primarily on the upper mounting bracket 212 and the upper pivot arm 222, between which the extension spring 23 is mounted. FIG. 10 is a schematic diagram to illustrate changes in positions of and the inter-relationships among the turning axis (O), the first post 215, and the second post 225, as well as changes in the tension force of the extension spring 23 and the force components thereof, during the process of turning of the door panel 22 between the closed and open positions. In FIG. 10, (O') represents the position of the first post 215 to which the first end 231 of the extension spring 23 is hooked, and (O") represents the position of the second post 225 to which the second end 232 of the extension spring 23 is hooked. When the door panel 22 is at the closed position, the second post 225 and the turning axis (O) are located at an inner side of the first post 215, and the turning axis (O) is located at a front side of the extension spring 23. Therefore, the first and second posts 215, 225 and the turning axis (O) cooperatively define a triangle (O', O", O) such as that depicted in FIG. 10, where the distance between the first and second posts 215, 225 is greater than that between the first post 215 and the turning axis (O) and that between the second post 225 and the turning axis (O), i.e., $\overline{O'O''} > \overline{O'O}$, and $\overline{O'O''} > \overline{O''O}$. It is particularly noted that the line $\overline{O'O''}$ must be the longest side of the triangle defined in this embodiment, and that the lines $\overline{O'O}$ and $\overline{O''O}$ may be equal or not equal in length. Moreover, a first straight line (L1) extending from the line $\overline{OO''}$ represents the door panel 22 at the closed position.

Since a tension force (Fp) acting in a direction from (O") to (O') will be developed at the second end 232 of the extension spring 23, an angle (θ) is formed between the line $\overline{O''O'}$ and the line $\overline{O''O}$. Therefore, a force component (Ft) which is perpendicular to the line $\overline{O''O}$ will be developed at (O"). The magnitude of the force component (Ft) is equal to the tension force (Fp)×sin θ. A torque (T) (equal to (Ft)×$\overline{O''O}$) will thus be developed to drive the door panel 22 to turn. Since the direction of the torque (T) is toward the front side of the face panel 21, when the door panel 22 is at the closed position, the panel body 221 can abut tightly against the front side of the face panel 21 due to the torque (T).

Figure 8:
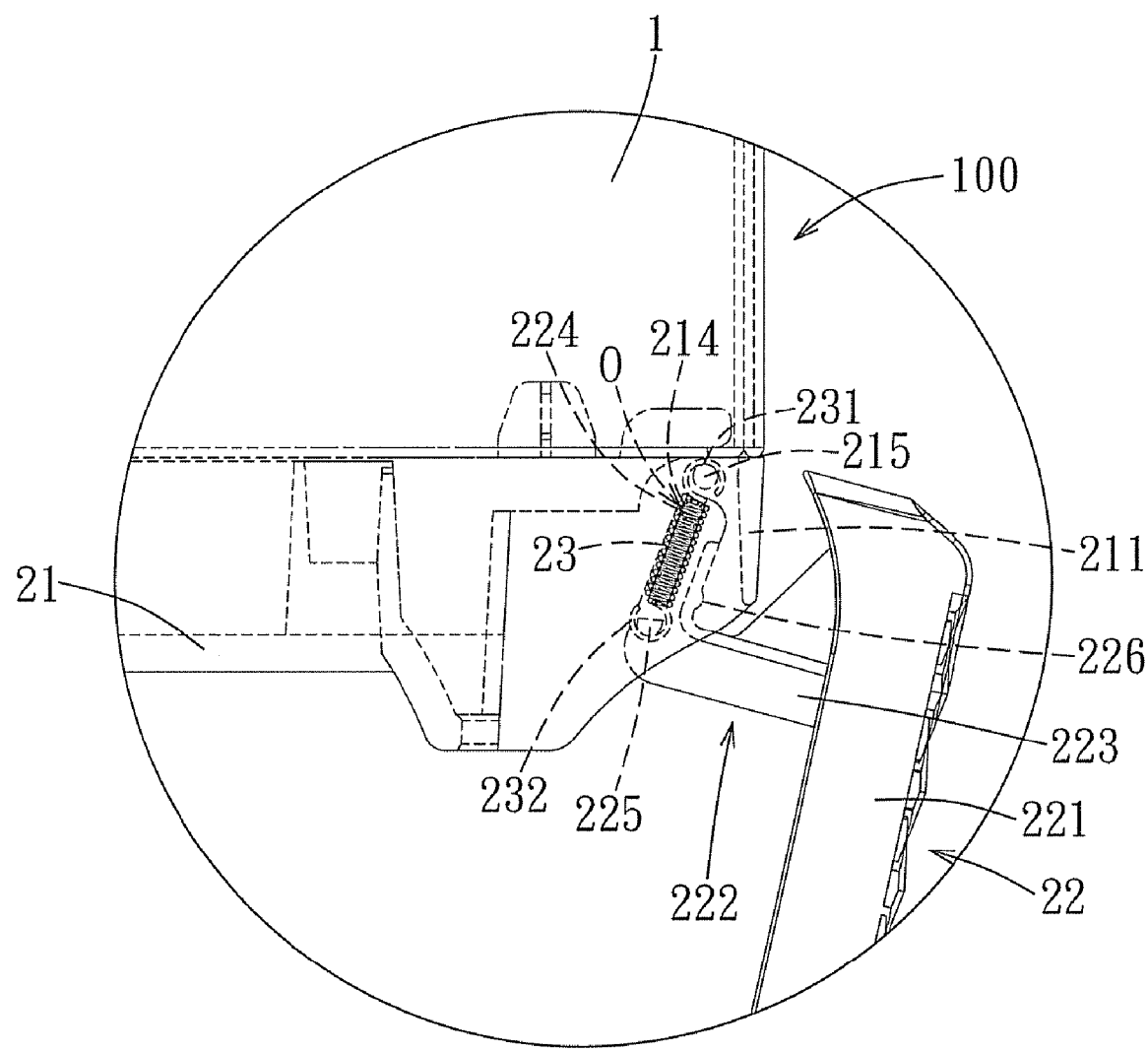
FIG. 8 is an enlarged fragmentary top view to illustrate the door panel of the preferred embodiment of a door panel opening and closing device for a casing according to the present invention at a specific angular position.

Referring to FIGS. 7, 8 and 10, when it is desired to move the door panel 22 away from the closed position, the user needs to pull the panel body 221 in a direction indicated by the arrow (V) (opposite to the direction of the torque (T)), and the pulling force has to be greater than the torque (T) so that the door panel 22 can be turned smoothly relative to the face panel 21. Since the positions of the arm portions 223 of the pivot arm 222 change during the process of turning of the door panel 22, and since the distance between (O') and (O) and the distance between (O") and (O) are of fixed values, when the door panel 22 is being moved away from the closed position, the distance between (O') and (O") gradually increases while the angle (θ) gradually decreases (e.g., angle (θ') in FIG. 10 is smaller than angle (θ)). Therefore, values of the force component (Ft) and the torque (T) will become smaller with the gradual decrease in the value of the angle (θ) (e.g., the force component (Ft') in FIG. 10 is less than the force component (Ft), and the torque (T') is less than the torque (T)).

When the door panel 22 is turned to a specific angular position (as shown in FIG. 8) between the closed position and the open position where the first post 215, the turning axis (O), and the second post 225 are sequentially located on the same straight line, i.e., (O'), (O), and (O") are sequentially located on a second straight line (L2) as shown in FIG. 10, since the angle (θ) is reduced to 0° at that instant, the force component (Ft") of the tension force (Fp") of the extension spring 23 is zero, which indicates that the torque (T") is also zero. Furthermore, since the distance between (O') and (O") is the longest at that instant, the tension force (Fp") of the extension spring 23 is the largest. The door panel 22 is therefore placed in an unstable balanced state. The line $\overline{O''O'}$ and the line $\overline{O''O}$ will include an angle (θ''') the instant (O") moves past the second straight line (L2). At this point, the direction of the force component (Ft''') of the tension force (Fp''') will change (opposite to the directions of the force components (Ft, Ft')), so that a torque (T''') having a direction opposite to those of the torques (T, T') will be developed. As a result, the door panel 22 can be brought by the torque (T''') to turn automatically relative to the face panel 21 in the direction indicated by arrow (V) without application of a force to the panel body 221 of the door panel 22 by the user.

It should be noted that, since the distance between (O') and (O") gradually increases and the angle (θ) gradually decreases when the door panel 22 is being moved away from the closed position, the values of the force component (Ft) and the torque (T) will gradually decrease with the diminishing angle (θ). Therefore, even if the pulling force applied by the user to the panel body 221 during the pulling process is gradually decreased, the door panel 22 can still be brought to turn from the closed position to the specific angular position.

Figure 9:
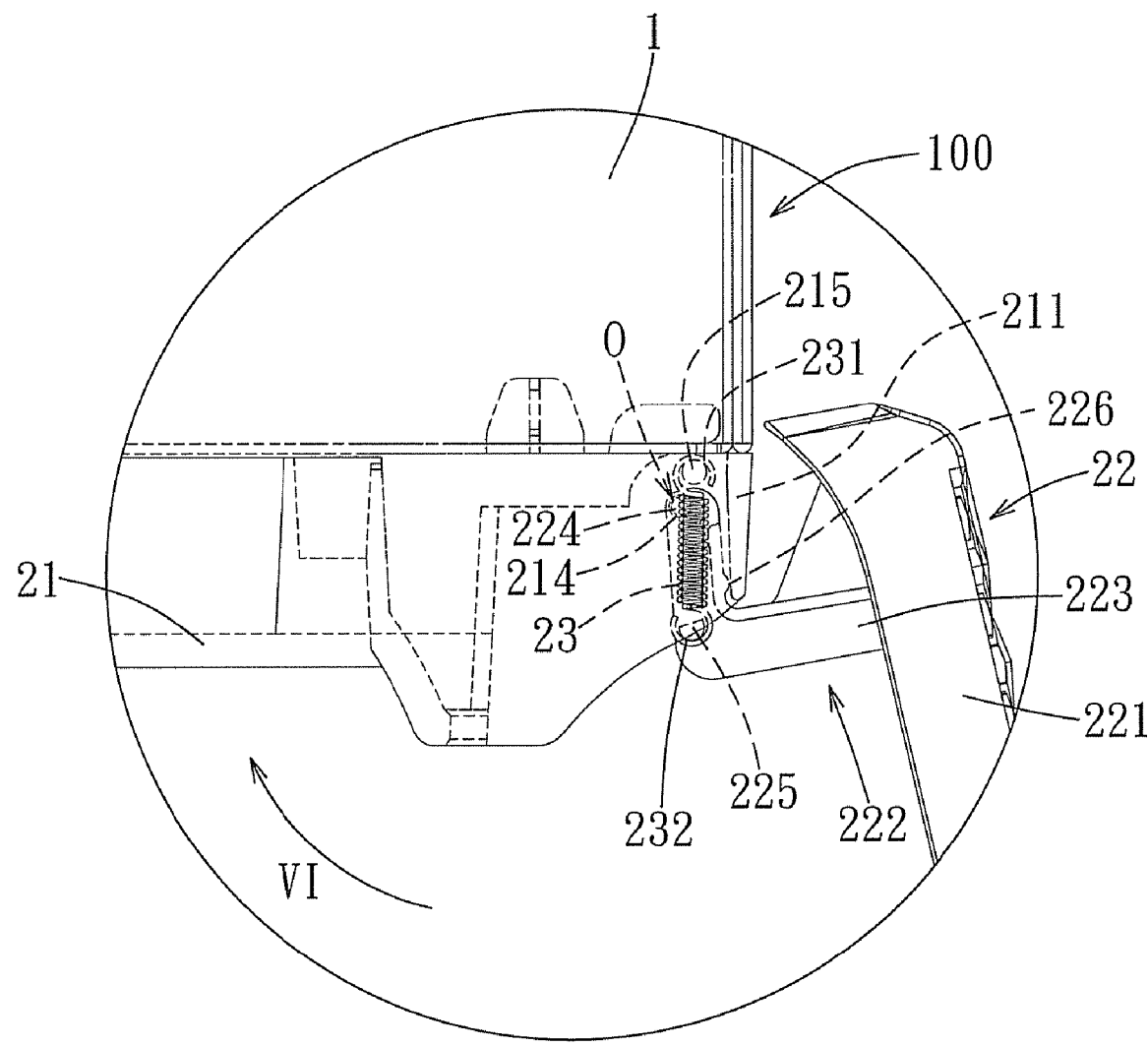
FIG. 9 is an enlarged fragmentary top view to illustrate the door panel of the preferred embodiment of a door panel opening and closing device for a casing according to the present invention at the open position.

Referring to FIGS. 9 and 10, since each of the arm portions 223 of the pivot arms 222 is provided with a curved stop portion 226 projecting therefrom, when the door panel 22 is turned by the torque (T''') such that the stop portions 226 abut against the inner wall surface of the sidewall 221, the door panel 22 can turn relative to the face panel 21 no further. Thus, the turning angle of the panel body 221 is limited to prevent the panel body 221 from bumping against an outer wall surface of the sidewall 211 or the casing body 1, and the door panel 22 can be disposed at the open position. When the door panel 22 is at the open position, since the second post 225 and the turning axis (O) are located at a front side of the first post 215, and since the turning axis (O) is located at an inner side of the extension spring 23, the first and second posts 215, 225 and the turning axis (O) cooperatively define another triangle (O', O", O), and a third straight line (L3) extending from the line $\overline{OO''}$ represents the door panel 22 at the open position. Since the angle (θ'''') is slightly larger than the angle (θ'''), the values of the force component (Ft'''') and the torque (T''∝1) will be greater than those of the force component (Ft''') and the torque (T'''), respectively. Under the action of the torque (T''''), the stop portions 226 on the pivot arms 222 will abut tightly against the inner wall surface of the sidewall 211 to enable the door panel 22 to be positioned stably at the open position.

On the contrary, when it is desired to turn the door panel 22 from the open position to the closed position, the user needs to push the panel body 221 in a direction indicated by arrow (VI) (opposite to the direction of the torque (T'''')) with a force greater than the torque (T'''') so that the door panel 22 can be turned smoothly relative to the face panel 21. When the door panel 22 is being moved away from the open position and is being turned along the direction indicated by arrow (VI), since the distance between (O') and (O") gradually increases and the angle (θ'''') gradually decreases (e.g., the angle (θ''') in FIG. 10 is smaller than angle (θ'''')), the values of the force component (Ft'''') and the torque (T'''') will gradually decrease with the diminishing angle (θ''''). Thus, even if the force applied to the panel body 221 by the user is gradually decreased during the process of pushing, the door panel 22 can still be brought to turn from the open position to the specific angular position.

When the door panel 22 is turned to the specific angular position (see FIG. 8), since (O'), (O), and (O") are sequentially located on the second straight line (L2) as shown in FIG. 10, and since the angle (θ'') at that instant is reduced to 0°, the force component (Ft'') of the tension force (Fp'') of the extension spring 23 is zero, which indicates that the value of the torque (T'') is also zero. Moreover, since the distance between (O') and (O") is the longest at that instant, the tension force (Fp'') of the extension spring 23 is the largest. The door panel 22 is therefore placed in an unstable balanced state once again. The line $\overline{O''O'}$ and the line $\overline{O''O}$ will include an angle (θ') the instant (O") moves past the second straight line (L2). At this point, the direction of the force component (Ft') of the tension force (Fp') will change (opposite to the directions of the force components (Ft'''', Ft''')), so that a torque (T') having a direction opposite to those of the torques (T'''', T''') will be developed. As a result, the door panel 22 can be brought by the torque (T') to return to the closed position along the direction indicated by arrow (VI) without application of a force to the panel body 221 of the door panel 22 by the user.

By virtue of the design that the distance between the first and second posts 215, 225 is greater than that between the first post 215 and the turning axis (O) and that between the second post 225 and the turning axis (O), when the door panel 22 is turned relative to the face panel 21 from the closed position or the open position to the specific angular position, the first post 215, the turning axis (O), and the second post 225 can be sequentially located on the second straight line (L2). Furthermore, when it is desired to turn the door panel 22 from the closed position to the open position, the user merely needs to turn the door panel 22 such that the door panel 22 barely passes through the specific angular position (i.e., with (O") barely moving past the second straight line (L2)), and the direction of the force component (Ft''') of the tension force (Fp''') of the extension spring 23 will change to an outward direction so that the torque (T''') can cause the door panel 22 to automatically spring to the open position. Conversely, when it is desired to turn the door panel 22 from the open position to the closed position, the user merely needs to turn the door panel 22 such that the door panel 22 barely passes through the specific angular position (i.e., with (O") barely moving past the second straight line (L2)), and the direction of the force component (Ft') of the tension force (Fp') of the extension spring 23 will change to an inward direction so that the torque (T') can cause the door panel 22 to automatically spring to the closed position. Furthermore, through the arrangement of the extension spring 23 between the two arm portions 223 of the upper pivot arm 222, there is no need to provide extra room for movement of the extension spring 23, and the extension spring 23 will not come into interference with the first and second pivot members 214, 224 when being brought to turn by the door panel 22.

It is particularly noted that, in this embodiment, the included angle between the first straight line (L1) and the second straight line (L2) is approximately 70 degrees, and the included angle between the third straight line (L3) and the second straight line (L2) is approximately 40 degrees. Certainly, the included angle between the first straight line (L1) and the second straight line (L2) and that between the third straight line (L3) and the second straight line (L2) may vary with a change in lengths of the sides of the triangle formed by the points (O'), (O") and (O), and should not be limited to the angles disclosed herein.

In summary, in the door panel opening and closing device 2 of this embodiment, due to the relationships among the first post 215, the second post 225 and the turning axis (O), turning of the door panel 22 from the closed position to the open position merely requires the user to move the door panel 22 slightly past the specific angular position, whereupon the direction of the force component (Ft''') of the tension force (Fp''') of the extension spring 23 will change to an outward direction and the resultant torque (T''') will cause the door panel 22 to automatically spring to the open position. Conversely, turning of the door panel 22 from the open position to the closed position merely requires the user to move the door panel 22 slightly past the specific angular position, whereupon the direction of the force component (Ft') of the tension force (Fp') of the extension spring 23 will change to an inward direction and the resultant torque (T') will cause the door panel 22 to automatically spring to the closed position. Thus, the intended objects of this invention can be achieved.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A door panel opening and closing device for a casing, comprising:
a face panel including a base wall and a first post disposed on said base wall;
a door panel including a pivot arm connected pivotally to said base wall, a pivot juncture between said pivot arm and said base wall being defined as a turning axis, said pivot arm including a second post disposed parallel to and spaced apart from said first post, said door panel being turnable about the turning axis between a closed position where said door panel shields a front side of said face panel and an open position where said front side of said face panel is accessible, wherein said face panel further includes a sidewall connected to said base wall, said door panel further including a panel body for shielding said front side of said face panel, said pivot arm being disposed on a rear surface of said panel body, and including a stop portion for abutting against an inner wall surface of said sidewall so as to limit a turning angle of said panel body; and
a resilient member having two ends connected respectively to said first post and said second post i when said door panel is disposed at the closed position, said second post and the turning axis are located at an inner side of said first post, the turning axis is located at a front side of said resilient member, and said first and second posts and the turning axis cooperatively define a triangle i when said door panel is disposed at a specific angular position between the closed position and the open position, said first post, the turning axis, and said second post are sequentially located on a same straight line; said door panel automatically springing to the open position by virtue of a change in a direction of a force component of a tension force of said resilient member to an outward direction once said door panel is turned from the closed position past the specific angular position.

2. The door panel opening and closing device for a casing of claim 1, wherein said resilient member is an extension spring having two ends hooked to said first post and said second post, respectively.

3. The door panel opening and closing device for a casing of claim 2, wherein a distance between said first and second posts is greater than that between said first post and the turning axis and that between said second post and the turning axis.

4. The door panel opening and closing device for a casing of claim 2, wherein said pivot arm includes two L-shaped arm portions that are spaced apart one above the other, said second post being connected to said arm portions, said resilient member being received between said arm portions.

5. The door panel opening and closing device for a casing of claim 4, wherein said face panel further includes a first pivot member disposed on said base wall, said pivot arm further including a second pivot member disposed on one of said arm portions and connected pivotally to said first pivot member, said first pivot member being one of a pivot hole and a pivot pin, said second pivot member being the other of said pivot hole and said pivot pin, said first and second pivot members cooperatively defining the turning axis.

6. The door panel opening and closing device for a casing of claim 1, wherein the turning axis is located at an inner side of said resilient member when said door panel is at the open position, said door panel automatically springing back to the closed position by virtue of a change in the direction of the force component of the tension force of said resilient member to an inward direction once said door panel is turned from the open position past the specific angular position.

7. The door panel opening and closing device for a casing of claim 6, wherein said resilient member is an extension spring having two ends hooked to said first post and said second post, respectively, a distance between said first and second posts being greater than that between said first post and the turning axis and that between said second post and the turning axis.

8. The door panel opening and closing device for a casing of claim 7, wherein the distance between said first and second posts gradually increases when said door panel is being turned from the closed position or the open position to the specific angular position, the distance between said first and second posts being the longest and a value of the tension force of said resilient member being the largest when said door panel is at the specific angular position.

9. The door panel opening and closing device for a casing of claim 7, wherein said pivot arm includes two L-shaped arm portions that are spaced apart one above the other, said second post being connected to said arm portions, said resilient member being received between said arm portions.

10. The door panel opening and closing device for a casing of claim 9, wherein said face panel further includes a first pivot member disposed on said base wall, said pivot arm further including a second pivot member disposed on one of said arm portions and connected pivotally to said first pivot member, said first pivot member being one of a pivot hole and a pivot pin, said second pivot member being the other of said pivot hole and said pivot pin, said first and second pivot members cooperatively defining the turning axis.

11. A door panel opening and closing device for a casing, comprising:
a face panel including a base wall and a first post disposed on said base wall;
a door panel including a pivot arm connected pivotally to said base wall, a pivot juncture between said pivot arm and said base wall being defined as a turning axis, said pivot arm including a second post disposed parallel to and spaced apart from said first post, said door panel being turnable about the turning axis between a closed position where said door panel shields a front side of said face panel and an open position where said front side of said face panel is accessible; and
a resilient member having two ends connected respectively to said first post and said second post;
when said door panel is disposed at the open position, said second post and the turning axis are located at a front side of said first post, said turning axis is located at an inner side of said resilient member, and said first and second posts and the turning axis cooperatively define a triangle;
when said door panel is disposed at a specific angular position between the closed position and the open position, said first post, the turning axis, and said second post are sequentially located on a same straight line; said door panel automatically springing to the closed position by virtue of a change in a direction of a force component of a tension force of said resilient member to an inward direction once said door panel is turned from the open position past the specific angular position, and wherein said face panel further includes a sidewall connected to said base wall, said door panel further including a panel body for shielding said front side of said face panel, said pivot arm being disposed on a rear surface of said panel body, and including a stop portion for abutting against an inner wall surface of said sidewall so as to limit a turning angle of said panel body.

12. The door panel opening and closing device for a casing of claim 11, wherein said resilient member is an extension spring having two ends hooked to said first post and said second post, respectively.

13. The door panel opening and closing device for a casing of claim 12, wherein a distance between said first and second posts is greater than that between said first post and the turning axis and that between said 25 second post and the turning axis.

14. The door panel opening and closing device for a casing of claim 11, wherein, when said door panel is disposed at the closed position, said second post and the turning axis are located at an inner side of said first post, and said turning axis is located at a front side of said resilient member, said door panel automatically springing to the open position by virtue of a change in the direction of the force component of the tension force of said resilient member to an outward direction once said door panel is turned from the closed position past the specific angular position.

15. The door panel opening and closing device for a casing of claim 14, wherein said resilient member is an extension spring having two ends hooked to said first post and said second post, respectively, a distance between said first and second posts being greater than that between said first post and the turning axis and that between said second post and the turning axis.

16. The door panel opening and closing device for a casing of claim 15, wherein the distance between said first and second posts gradually increases when said door panel is being turned from the closed position or the open position to the specific angular position, the distance between said first and second posts being the longest and a value of the tension force of said resilient member being the largest when said door panel is at the specific angular position.

17. The door panel opening and closing device for a casing of claim 15, wherein said pivot arm includes two L-shaped arm portions that are spaced apart one above the other, said second post being connected to said arm portions, said resilient member being received between said arm portions.

18. The door panel opening and closing device for a casing of claim 17, wherein said face panel further includes a first pivot member disposed on said base wall, said pivot arm further including a second pivot member disposed on one of said arm portions and connected pivotally to said first pivot member, said first pivot member being one of a pivot hole and a pivot pin, said second pivot member being the other of said pivot hole and said pivot pin, said first and second pivot members cooperatively defining the turning axis.

* * * * *